United States Patent Office 3,580,828
Patented May 25, 1971

3,580,828
ELECTRODEPOSITION OF LITHIUM
Thomas Bradley Reddy, Pound Ridge, N.Y., assignor to American Cyanamid Company, Stamford, Conn.
No Drawing. Filed Dec. 16, 1968, Ser. No. 784,202
Int. Cl. C23b 5/00
U.S. Cl. 204—14
9 Claims

ABSTRACT OF THE DISCLOSURE

Cohesive, dense deposits of lithium having a specular appearance are obtained by electrodeposition from anhydrous electrolyte of lithium salt in organic solvent. Electrolyte concentration is 0.05 to 0.20 mole lithium salt per liter and current density is 0.05 to 0.25 milliampere per square centimeter.

This invention relates to electroplating, particularly to plating of lithium from an electrolyte comprising lithium salt in non-aqueous organic liquid solvents.

Previously reported methods for electrodeposition of lithium from organic electrolytes produce acicular or mossy deposits, all having poor cohesion and adhesion so that the deposited metal is easily dislodged during or after deposition.

An object of the invention is to provide a method for electrodeposition of a dense, cohesive, specular deposit of lithium from an organic electrolyte. The invention is particularly useful in making lithium anodes for voltaic cells and for recharging secondary cells having a lithium anode with organic solvent electrolyte. It may also find use in manufacture of other metal articles, for example a lithium plated electrical contact.

In a process according to the invention lithium is electrodeposited on a substrate of lithium, stainless steel, copper, nickel or the like from an anhydrous solution of lithium salt in an organic solvent. The cohesive specular deposit is obtained using an electrolyte having lithium salt concentration in the range from 0.05 to 0.20 mole per liter of electrolyte and by plating at current density in the range from 0.05 to 0.25 milliampere per square centimeter (ma./cm.$^2$). The most preferred organic solvent for the electrolyte is propylene carbonate and the most preferred electrolyte salts are lithium bromide and lithium perchlorate, however one might substitute other suitable anhydrous organic solvents in which lithium metal is stable, such as N-methyl pyrrolidinone, dimethyl sulfite, methyl formate, gamma-butyrolactone, dimethylsulfite, propionitrile, ethylene sulfite, bis-dimethylaminosulfoxide, and the like or mixtures of such organic compounds or mixtures of a stable solvent with acetonitrile. One may substitute other lithium salts, using concentrations and currents within the same defined ranges to obtain the desired cohesive specular lithium deposit.

Both the concentration and the current density limits must be observed; and electrodeposition process carried out at values outside either of the defined ranges will produce unsuitable deposits either mossy or acicular in character, or a combination of these forms, in a deposit of poor cohesion. The dense, coherent mirror-like deposit obtained in accordance with the invention appears under microscopic examination to be composed of rounded crystallites and areas of consolidated crystal grains practically free of acicular and mossy structures.

The best deposits yet obtained have been from a solution of 0.1 molar lithium bromide or lithium perchlorate in propylene carbonate at a current density of 0.1 ma./cm.$^2$, at 25° C. and with some stirring of the electrolyte. Generally it has been found at average overpotential of about 25 millivolts (mv.) or less (as measured against a non-working lithium reference electrode positioned close to the cathode of the cell) the deposits obtained are specular in appearance and contain none or only very few of the acicular or grainy forms. It would be expected that concentration overpotential would decrease as concentration of the salt in the electrolyte solvent is increased, hence one would expect higher concentration would favor the desired form of deposit. It is found however that overpotential is less (25 mv.) at 0.100 ma./cm.$^2$ in 0.1 M lithium bromide than the overpotential (41 mv.) at the same current in 0.5 M lithium bromide. This unexpected phenomenon is not yet fully explained.

Although stirring of the electrolyte and change in temperature will have some effect on the quality of the deposit, changes in these factors are not found to substantially alter the defined limits of current density and concentration within which the specular coherent deposits can be obtained. Deposition can be carried out at temperatures in the range from about −40° C. to about +65° C.

A large number of electrodeposition runs are made by the same method described in Example I below, but operating the respective runs with various combinations of current density values and electrolyte concentration values to determine the ranges in which the desired dense specular deposits are obtained. Runs are made at current densities from 10.0 to 0.05 ma./cm.$^2$ at several intervals (e.g. 10, 5.0, 1.0, 0.5, 0.25, 0.1 and 0.05 ma./cm.$^2$) and for each selected current density, runs are made at several different concentrations of electrolyte (e.g. 1.0, 0.5, 0.3, 0.2, 0.1, and 0.05 molar) in order to determine the effective operating ranges. Plating at conditions below the lower current limit of 0.05 ma./cm.$^2$ or below the lower concentration limit of 0.05 molar will not produce a suitable cohesive specular deposit, and plating below those limits is so slow and costly as to be impractical. If either of the defined upper limits is exceeded, either above 0.25 ma./cm.$^2$ or above 0.20 molar concentration, the deposit begins to lose its coherent, dense consolidated structure and its specular appearance and elongated crystals or filaments or a mossy structure will begin to develop in the deposit with consequent loss of cohesion.

Following are specific examples with detailed description of the best mode presently contemplated of carrying out the invention. Full scope of the invention may include other embodiments with modifications and variations from the specific details of these examples.

EXAMPLE 1

A one square centimeter tab of 99.98% pure nickel is potted in a cylinder of one inch diameter using potting compound composed of epoxy resin mixed with ground porcelain filler and a hardener. The potting compound is insoluble in and unreactive toward solutions of lithium salts in propylene carbonate. The square tab of nickel is polished on its face using standard technique (ASTM Standards; part 31, page 65), ending with a lap of 0.3 micron alumina. An electrolytic cell is assembled with polished nickel tab as the cathode and with an isolated Ni/Ni$^{++}$ electrode as the counter electrode. An internal Li/Li$^+$ electrode may be substituted as the counter electrode. The cell also includes a reference electrode of freshly cleaved lithium in the same electrolyte solution. The cell is assembled completely sealed under argon and then is transferred to the atmosphere for deposition. The cell is connected to a regulated constant direct current power supply. The electrolyte solvent is propylene carbonate which has been purified using molecular sieves and a spinning band column. Anhydrous lithium bromide is refined by known techniques to reduce water content to 20 p.p.m. or less. Lithium perchlorate may be similarly refined to the same purity. The prepared lithium bromide is dissolved in propylene carbonate, bringing the concentration to 0.10 mole per liter of solution. The electrolyte solution is placed in the cell which is equipped with a polytetrafluoroethylene covered magnetic stirring bar within the cell, activated by a motor driven magnetic drive outside the cell. The cell is then operated at constant current of 0.100 ma./cm.$^2$ at 25° C. with constant stirring of the electrolyte for 150 minutes until 0.900 coulomb/cm.$^2$ is deposited. The cell is disassembled in an argon filled dry bag, the sample is rinsed with purified propylene carbonate and a cover glass is placed over the wet surface. The plated surface is examined in a Balphot metallograph at magnification of 500×. Under the microscope the deposit is seen to consist largely of shiny globular nuclei of lithium with consolidated grains of lithium. The deposit has a uniform specular appearance and adheres well to the nickel substrate.

An electrode plated under the same conditions but for 5 hours instead of 150 minutes shows only very slight increase in the occurrence of filaments; the globular consolidated structure remains.

Other electrodeposition processes using the equipment described above but varying the constant current density value and the electrolyte concentration value for each respective run demonstrate that the dense cohesive specular deposits are obtained at currents in the range from 0.05 to 0.25 ma./cm.$^2$ and with electrolyte concentrations from 0.05 to 0.20 M lithium bromide. Essentially the same results are obtained using electrolyte with lithium perchlorate instead of lithium bromide in the proplyene carbonate electrolyte solutions. Essentially the same results are obtained using substrates of copper, stainless steel and lithium instead of nickel. Electrodeposition processes carried out with either the current density value or the electrolyte concentration value above the defined limits results in deposits characterized by presence of substantial mossy or acicular deposits or deposits with mixtures of these forms and lacking the cohesive strength of the specular deposits of the invention.

I claim:
1. In a process for electrodeposition of lithium from anhydrous electrolyte consisting essentially of lithium bromide or percholate in an organic liquid solvent, the improvement wherein said electroplating is carried out with electrolyte having concentration of lithium salt in the range from 0.05 to 0.20 mole per liter of electrolyte and with constant current density at the negative electrode in the range from 0.05 to 0.25 ma./cm.$^2$ and a coherent, dense lithium deposit of uniform specular appearance is obtained.
2. An improved process defined by claim 1 wherein said lithium salt is lithium perchlorate.
3. An improved method defined by claim 1 wherein said organic liquid solvent is propylene carbonate.
4. An improved method defined by claim 1 wherein said lithium salt is lithium bromide and said organic solvent is propylene carbonate.
5. An improved method defined by claim 1 wherein said lithium salt is lithium perchlorate and said organic solvent is propylene carbonate.
6. An improved method defined by claim 1 wherein the electrodeposition substrate is nickel.
7. An improved method defined by claim 1 wherein the electrodeposition substrate is copper.
8. An improved method defined by claim 1 wherein the electrodeposition substrate is stainless steel.
9. An improved method defined by claim 1 wherein the electrodeposition substrate is lithium.

References Cited
UNITED STATES PATENTS 2,615,838   10/1952   Minnick et al. _____ 204—59

OTHER REFERENCES

Klochko, "Electrochemical Production of Light Metals from Non-Aqueous Solutions," J. Appl. Phys. (U.S.S.R.) 9, 420–33 (1936).

PATRICK P. GARVIN, Primary Examiner